(12) United States Patent
Zhu et al.

(10) Patent No.: US 11,772,687 B1
(45) Date of Patent: Oct. 3, 2023

(54) LOW-ENERGY-CONSUMPTION GRADING AND POSITIONING METHOD FOR COAL MINE AUXILIARY TRANSPORTATION VEHICLE AND SYSTEM THEREOF

(71) Applicants: CHINA UNIVERSITY OF MINING AND TECHNOLOGY, Jiangsu (CN); Xuzhou Kerui Mining Technology Co., Ltd., Jiangsu (CN)

(72) Inventors: Zhencai Zhu, Jiangsu (CN); Fan Jiang, Jiangsu (CN); Xingtao Huang, Jiangsu (CN); Gongbo Zhou, Jiangsu (CN); Niansheng Liu, Jiangsu (CN); Libing Wang, Jiangsu (CN); Chuansheng Zhang, Jiangsu (CN); Junfeng Guo, Jiangsu (CN); Gang Shen, Jiangsu (CN); Shuman Cheng, Jiangsu (CN); Jinlei Ma, Jiangsu (CN); Chaofan Zhang, Jiangsu (CN); Wenwen Yi, Jiangsu (CN)

(73) Assignees: China University of Mining and Technology, Jiangsu (CN); Xuzhou Kerui Mining Technology Co., LTD, Jiangsu (CN)

( * ) Notice: Subject to any disclaimer, the term of this patent is extended or adjusted under 35 U.S.C. 154(b) by 0 days.

(21) Appl. No.: 18/029,326

(22) PCT Filed: Sep. 30, 2022

(86) PCT No.: PCT/CN2022/123136
§ 371 (c)(1),
(2) Date: Mar. 29, 2023

(30) Foreign Application Priority Data

Mar. 21, 2022 (CN) .......................... 202210275775.4

(51) Int. Cl.
*B61D 11/00* (2006.01)
*G05D 1/02* (2020.01)
*E21F 17/18* (2006.01)

(52) U.S. Cl.
CPC .............. *B61D 11/00* (2013.01); *E21F 17/18* (2013.01); *G05D 1/02* (2013.01); *G05D 2201/021* (2013.01)

(58) Field of Classification Search
CPC .......... B61D 11/00; E21F 17/18; G05D 1/028
See application file for complete search history.

(56) References Cited

U.S. PATENT DOCUMENTS

| | | | | |
|---|---|---|---|---|
| 6,633,800 B1 * | 10/2003 | Ward | .................. | G05D 1/0038 |
| | | | | 701/34.2 |
| 6,694,233 B1 * | 2/2004 | Duff | ..................... | G05D 1/0246 |
| | | | | 73/178 R |

(Continued)

FOREIGN PATENT DOCUMENTS

| | | |
|---|---|---|
| CN | 102201075 | 9/2011 |
| CN | 103016061 | 4/2013 |

(Continued)

OTHER PUBLICATIONS

Written opinion of the International Searching Authority, International Patent Application No. PCT/CN2022/123136, dated Nov. 23, 2022, 5 pages.

*Primary Examiner* — Albert K Wong
(74) *Attorney, Agent, or Firm* — CASIMIR JONES, S.C.; Brian F. Bradley

(57) ABSTRACT

The present disclosure discloses a low-energy-consumption grading and positioning method and system for a coal mine auxiliary transportation vehicle, which belongs to the technical field of mine tunnel transportation. The method comprises the following steps: S10, determining an optimal transportation route of a vehicle, and dividing the optimal transportation route into a plurality of locked intervals; S20, determining an initial velocity $v_0$ of the vehicle passing through each locked interval; S30, constructing a discretization mileage estimation model to update a real-time posi- (Continued)

tion of the vehicle, and obtaining dynamic track information of the vehicle in each locked interval; S40, constructing a [v0, t] prediction model, and obtaining a theoretical time $t_0$ of the vehicle passing through each locked interval through the prediction model; S50, comparing a actual time t and the theoretical time $t_0$ of the vehicle passing through each locked interval, and selecting whether to start overtime early warning or overtime alarm; and S60, repeating S30 to S50 after the vehicle enters the next locked interval. The low-energy-consumption grading and positioning method and system for the coal mine auxiliary transportation vehicle provided in the present disclosure realizes on-demand positioning of the underground vehicle and reduces the consumption and cost of positioning.

10 Claims, 4 Drawing Sheets

(56) References Cited

U.S. PATENT DOCUMENTS

| | | | | |
|---|---|---|---|---|
| 8,090,491 | B2* | 1/2012 | Barfoot | G08G 1/202 701/25 |
| 8,260,483 | B2* | 9/2012 | Barfoot | G08G 1/20 700/304 |
| 10,059,284 | B2* | 8/2018 | Ishii | B60R 16/0231 |
| 10,228,701 | B2* | 3/2019 | Tojima | E21F 13/00 |
| 2016/0123146 | A1 | 5/2016 | Makela | |
| 2018/0081368 | A1* | 3/2018 | Watanabe | G05D 1/0285 |
| 2022/0308589 | A1* | 9/2022 | Ishii | G08G 1/163 |
| 2022/0343585 | A1* | 10/2022 | Martikainen | E21F 13/00 |
| 2023/0059996 | A1* | 2/2023 | Makela | E21C 41/16 |

FOREIGN PATENT DOCUMENTS

| | | |
|---|---|---|
| CN | 103670513 | 3/2014 |
| CN | 105957382 | 9/2016 |
| CN | 107780970 | 3/2018 |
| CN | 110617110 | 12/2019 |
| CN | 113448281 | 9/2021 |
| CN | 113888140 | 1/2022 |
| CN | 114018273 | 2/2022 |
| CN | 114790912 | 7/2022 |
| JP | 2017199401 | 11/2017 |
| KR | 101711006 | 3/2017 |

* cited by examiner

LOW-ENERGY-CONSUMPTION GRADING AND POSITIONING METHOD FOR COAL MINE AUXILIARY TRANSPORTATION VEHICLE AND SYSTEM THEREOF

TECHNICAL FIELD

The present disclosure relates to the technical field of mine tunnel transportation, in particular to a low-energy-consumption grading and positioning method for a coal mine auxiliary transportation vehicle and a system thereof.

BACKGROUND

The space of underground roadways in coal mine is long and narrow and the roadway branches are numerous, which gives a great challenge to the positioning of underground material distribution vehicles. The traditional positioning methods either have low positioning accuracy or high positioning costs, which is difficult to balance the positioning accuracy and the positioning costs.

Although the existing positioning solutions are to realize the positioning of the material distribution vehicle by utilizing the RFID card reading device arranged in the roadway, in order to realize the real-time precise positioning without dead angles, the cost is high, the difficulty is great, the power supply is difficult, so the existing positioning solutions are not appropriate to be adopted.

Therefore, a more effective positioning solution that can satisfy the requirements for positioning accuracy and can reduce the positioning costs is urgently needed.

After searching, Chinese Patent Publication No.: CN103670513A; Publication Date: Mar. 26, 2014, discloses a positioning system for underground mine cars. The system includes ground equipment and underground equipment. The ground equipment includes a server, and a network switch connection with the server by circuits. The network switch is connected with a computer, a printer and a communication interface through cables. The ground equipment further includes an information center workstation. The underground equipment includes a wireless transmission substation and an identification card, and a signal transmitting device is built in the identification card, and the wireless transmission substation is in signal connection with the information center workstation through a cable. The positioning system of this application cannot effectively solve the problem of low positioning accuracy in underground.

In addition, Chinese Patent Publication No.: CN109451441A; Publication Date: Mar. 8, 2019, discloses a vehicle positioning system for a mine. The system includes a terminal, a mine car and at least one Bluetooth tag arranged in the mine tunnel. Each Bluetooth tag is fixed inside the mine tunnel according to a preset distance. The Bluetooth receiver matched with each Bluetooth tag is arranged on the mine car, the Bluetooth receiver is wirelessly connected with each Bluetooth tag. The mine car is further provided with a wireless communication module, the wireless communication module is respectively wirelessly connected with the Bluetooth receiver and the terminal, and the terminal is arranged outside the mine tunnel. The positioning system of the application can position the mine car in underground in accordance with the Bluetooth communication, and the positioning accuracy is improved, but the problem of high positioning cost still exists.

SUMMARY

In order to solve at least one of the above-mentioned technical problems, according to an aspect of the present disclosure, a low-energy-consumption grading and positioning method for a coal mine auxiliary transportation vehicle is provided, which comprises the following steps.

In S10, according to distribution information of a departure and a destination in the coal mine auxiliary transportation vehicle, an optimal transportation route of the coal mine auxiliary transportation vehicle is determined by utilizing a path planning algorithm, an RFID card reader is arranged at an intersection of a roadway corresponding to the optimal transportation route, and the optimal transportation route is divided into a plurality of locked intervals, and a length of each locked interval is the distance between two RFID card readers adjacent to each other.

In S20, an RFID tag is respectively set at front and rear ends of the coal mine auxiliary transportation vehicle, the distance between the two RFID tags is a length L of the coal mine auxiliary transportation vehicle, and an initial velocity $v_0$ of the coal mine auxiliary transportation vehicle passing through each locked interval is determined by utilizing the length L of the coal mine auxiliary transportation vehicle and the time T took by each RFID card reader to read the two tags at the front and rear ends of the coal mine auxiliary transportation vehicle.

In S30, a discretization mileage estimation model is constructed by utilizing the initial velocity $v_0$ of the coal mine auxiliary transportation vehicle passing through each locked interval to update a real-time position of the coal mine auxiliary transportation vehicle, and dynamic trajectory information of the coal mine auxiliary transportation vehicle in each locked interval is obtained.

In S40, a [v0, t] prediction model is constructed by utilizing the initial velocity $v_0$ of the coal mine auxiliary transportation vehicle passing through each locked interval and historical statistical information of a time t took by the coal mine auxiliary transportation vehicle passing through each locked interval, and a theoretical time $t_0$ of the coal mine auxiliary transportation vehicle passing through each locked interval is obtained through the prediction model.

In S50, an actual time t and the theoretical time $t_0$ of the coal mine auxiliary transportation vehicle passing through each locked interval are compared.

When $t \le t_0$, an overtime early-warning and an overtime alarm are not started, and a positioning of Step S30 is executed at this time.

When $t_0 \le t \le 1.1 t_0$, the overtime early-warning is started, and a driver is reminded that an overtime has occurs and an operation status is inquired.

When $t > t_0$, the overtime alarm is started, a remote server acquires position information of the coal mine auxiliary vehicle actively and corrects the dynamic trajectory information in Step S30 by using the position information, and a precise dynamic position and trajectory information of the coal mine auxiliary transportation vehicle are obtained.

In S60, the overtime alarm is ended after the coal mine auxiliary vehicle travels to an endpoint position of the locked interval and a card is read successfully, then when the coal mine auxiliary vehicle enters the next locked interval, Step S30, Step S40 and Step S50 are repeated.

According to the low-energy-consumption grading and positioning method for the coal mine auxiliary transportation vehicle provided in an embodiment of the present disclosure, preferably, in Step S10, the path planning algorithm includes the following.

Firstly, all feasible transportation routes $Line_i$ are determined by utilizing the distributions of the departure and the destination in combination with a roadway map.

Subsequently, the distance $X_i$ between each two card readers is determined in advance by utilizing a distribution and coding information of each RFID card reader in the roadway.

Then, the total mileage $S_i$ of each transportation rout is calculated.

Eventually, a minimum total mileage $S_{min}$ is obtained by comparing the total mileage of each transportation route, and a transportation route corresponding to the minimum total mileage $S_{min}$ is the optimal transportation route.

According to the low-energy-consumption grading and positioning method for the coal mine auxiliary transportation vehicle provided in an embodiment of the present disclosure, preferably, the coding information of the RFID card reader includes a serial number and position information of the RFID card reader as well as distance information between the RFID card reader and an adjacent RFID card reader.

According to the low-energy-consumption grading and positioning method for the coal mine auxiliary transportation vehicle provided in an embodiment of the present disclosure, preferably, the initial velocity $v_0$ in Step S20 is determined by a following formula, v0=L/T.

According to the low-energy-consumption grading and positioning method for the coal mine auxiliary transportation vehicle provided in an embodiment of the present disclosure, preferably, in Step S30, the discretization mileage estimation model is $x=v_0 t+w(t)$, where w(t) denotes a model noise.

According to the low-energy-consumption grading and positioning method for the coal mine auxiliary transportation vehicle provided in an embodiment of the present disclosure, preferably, the w(t) is determined by the following formula, w(t)=kt; where k denotes a complexity.

According to the low-energy-consumption grading and positioning method for the coal mine auxiliary transportation vehicle provided in an embodiment of the present disclosure, which is preferably as follows.

When the coal mine auxiliary transportation vehicle is in an upslope state, $k=-0.5v_0$.

When the coal mine auxiliary transportation vehicle is in a downslope state, $k=0.5v_0$.

When the coal mine auxiliary transportation vehicle is in a state of travelling on a flat road, k=0.

When the coal mine auxiliary transportation vehicle is in a state of parking and waiting or loading and unloading, $k=-v_0$.

According to the low-energy-consumption grading and positioning method for the coal mine auxiliary transportation vehicle provided in an embodiment of the present disclosure, preferably, in Step S40, the [v0, t] prediction model is constructed by utilizing the $v_0$ and the historical statistical information of t through a machine learning or deep learning.

According to the low-energy-consumption grading and positioning method for the coal mine auxiliary transportation vehicle provided in an embodiment of the present disclosure, preferably, in Step S50, the overtime early-warning and the overtime alarm are performed through an explosion-proof mobile phone terminal arranged in a cab of the coal mine auxiliary transportation vehicle.

When the overtime early-warning is performed, the remote server reminds and inquires the driver through the explosion-proof mobile phone terminal.

When the overtime alarm is performed, the remote server acquires position information of the explosion-proof mobile phone terminal actively, thereby determining precise position information of the coal mine auxiliary transportation vehicle.

According to another aspect of the present disclosure, provided is a low-energy-consumption grading and positioning system for a coal mine auxiliary transportation vehicle that is based on the low-energy-consumption grading and positioning method for the coal mine auxiliary transportation in the present disclosure, the system includes as follows.

An RFID card reading device is arranged at an entrance of a main roadway and an intersection of each roadway branch.

Two RFID tags are respectively arranged at front and rear ends of the coal mine auxiliary transportation vehicle.

An explosion-proof mobile phone terminal is arranged in a cab of the coal mine auxiliary transportation vehicle.

A wireless base station is arranged on one side of the main roadway and the roadway branch, and is configured to transmit a wireless signal.

The Beneficial Effects

Compared with the prior art, the present disclosure at least has the following beneficial effects.

The space of underground roadways in coal mine is long and narrow and the roadway branches are numerous. Compared with the traditional auxiliary transportation vehicle interval positioning, the position estimation in the method of the present disclosure realizes the fusion of a hardware interval positioning and a precise positioning processed by a software, and the present disclosure also has a precise positioning wake-up mechanism and has a higher positioning accuracy.

The precise positioning technology of the coal mine auxiliary transportation vehicles has the disadvantages of high cost, difficulty in power supply, and frequent battery replacement. However, the position estimation and the precise positioning wake-up mechanism in the method of the present disclosure can realize the on-demand positioning, and the precise positioning device does not need to operate in real time, which effectively reduces the energy consumption and the cost of the positioning system and prolongs the standby time of the explosion-proof mobile phone terminal.

Compared with the combination of the wired power supply and the mobile power supply in the traditional fusion technology of the interval positioning and the precise positioning, the present disclosure provides the interval positioning under the wired power supply and the "precise positioning" under the interval position estimation of the computer terminals under the wired power supply, which eliminates the problems of the difficulty in providing a mobile power supply for a long time and frequent replacement in the traditional solutions, and sets a precise positioning wake-up mechanism after the "precise positioning" fails under the estimation, so as to realize the dynamic on-demand positioning for the position of the coal mine auxiliary transportation vehicles.

The abnormal state of the overtime alarm in the present disclosure can be replaced by the emergency situation of the delivery vehicle, which effectively improves the utilization rate of the roadway, and realizes the efficient deploying of the material delivery vehicles and the handling of the abnormal state.

The low-energy-consumption grading and positioning system for the coal mine auxiliary transportation vehicle in the present disclosure utilizes the structural characteristics of the roadway, the existing wireless base stations and the RFID card reading devices in the underground, and cooperates with the position estimation and overtime alarm strategies in the method of the present disclosure to realize the on-demand positioning of the material distribution vehicles and reduce the energy consumption and cost of the positioning system, and ensure the rough interval positioning and the precise positioning in emergency for the material distribution vehicles. The abnormal state of the overtime alarm can be replaced by the emergency situation of the distribution vehicles, which effectively improves the utilization of the roadways, realizes the efficient deploying of material distribution vehicles and the handling of the abnormal states, and is simple and easy to operate, convenient and reliable.

BRIEF DESCRIPTION OF THE DRAWINGS

In order to describe the technical solutions in the embodiments of the present disclosure more clearly, the following will briefly introduce the accompanying drawings of the embodiments. It will be apparent that the accompanying drawings in the following description merely relate to some embodiments of the present disclosure, rather than limit the present disclosure.

REFERENCE NUMBER

Figure 1:
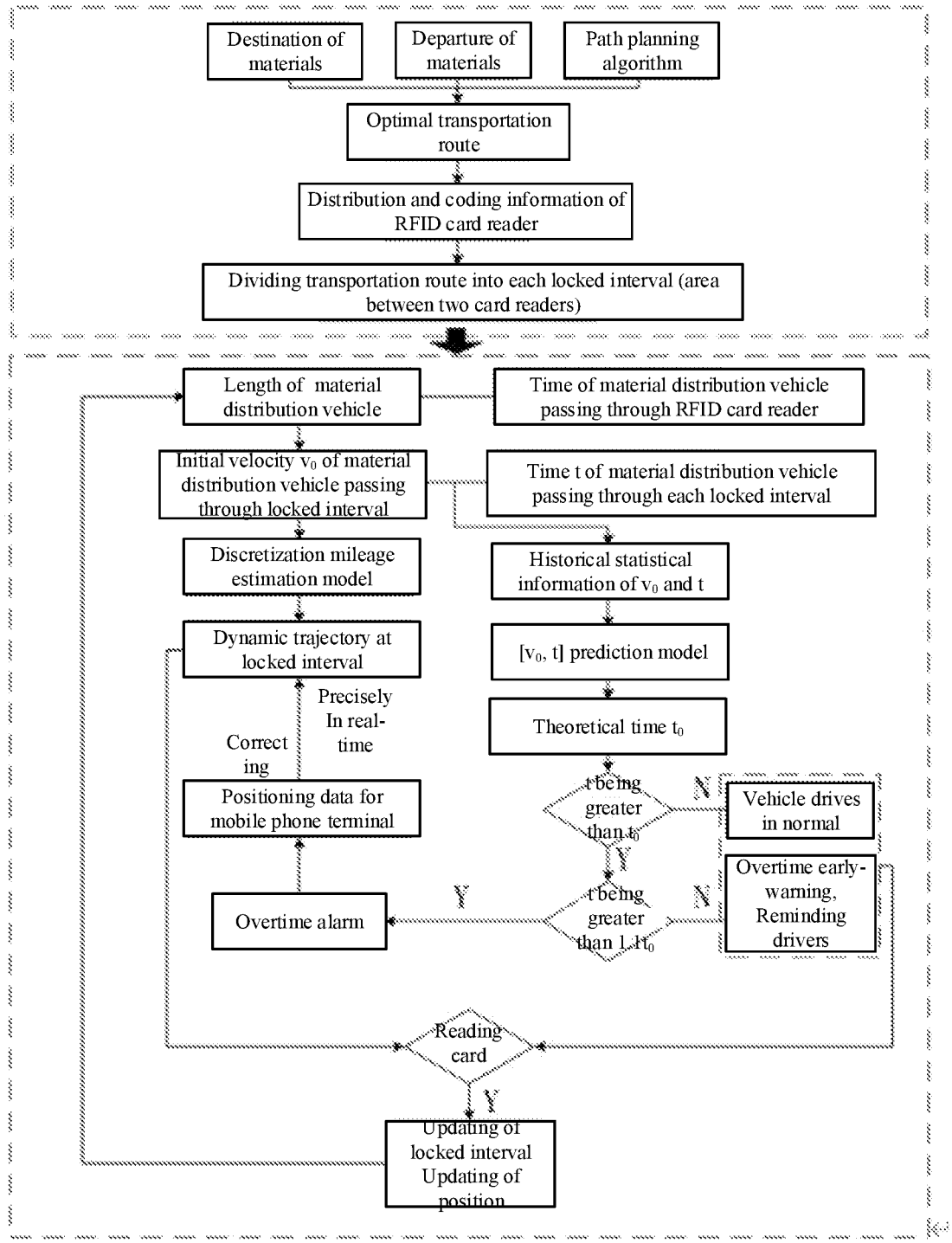
FIG. 1 illustrates a flow chart of a method in the present disclosure.

1. RFID card reading device; 2. Wireless base station; 3. Explosion-proof mobile phone terminal; 4. Coal mine auxiliary transportation vehicle; 5. Main roadway; 6. Roadway branch.

DETAILED DESCRIPTION OF THE EMBODIMENTS

In order to make the objectives, technical solutions and advantages in the embodiments of the present disclosure more clearer, the technical solutions in the embodiments of the present disclosure will be clearly and completely described below with reference to the accompanying drawings in the embodiments of the present disclosure. It will be apparent that the described embodiments are only a part of embodiments of the present disclosure rather than all the embodiments.

Unless otherwise defined, the technical terms or scientific terms used herein should have the ordinary meaning as understood by one of ordinary skill in the art to which the present disclosure belongs.

In view of the defects such as low accuracy, or high positioning cost and high energy consumption exist in the positioning solutions of the existing underground vehicles, the present disclosure provides a low-energy-consumption grading and positioning method for a coal mine auxiliary transportation vehicle and a system thereof. Based on the distinct structural characteristics of the underground roadways in coal mine, and in order to prevent the accidents such as occupying lanes for a long time, loss of positioning information, and traffic jams of the coal mine auxiliary transportation vehicle from occurring, the optimal transportation route and the distribution and coding information of the RFID card readers on the transportation route are determined by utilizing the path planning algorithm through the distribution of the departure and destination of the coal mine auxiliary transportation vehicle, and then all the routes are divided into each locked interval, the RFID card reader is arranged on the intersection of each roadway, the initial velocity and position information of the vehicle passing through each interval are determined through arranging tags at the front and rear ends of the vehicle, the rough dynamic trajectory information of the vehicle in the intervals is obtained by utilizing the discretization displacement formula, a prediction model is constructed though the historical information on the velocity of the vehicle passing through the departure of the interval and the time of the vehicle passing through the interval, to obtain a theoretical time of the vehicle passing through each interval, when the actual time of the vehicle passing through the interval exceeds a certain threshold value of the theoretical time, the overtime alarm is triggered, the real time position of the vehicle is acquired through the explosion-proof mobile phone terminal carried on the coal mine auxiliary transportation vehicle and the existing underground wireless base station to correct the above dynamic trajectory information, and realize the on-demand and low energy consumption positioning for the material delivery vehicle.

Embodiment 1

As illustrated in FIG. 1, a low-energy-consumption grading and positioning method for a coal mine auxiliary transportation vehicle in this embodiment includes the following steps.

In S10, according to distribution information of a departure and a destination of the coal mine auxiliary transportation vehicle, an optimal transportation route of the coal mine auxiliary transportation vehicle is determined by utilizing a path planning algorithm, an RFID card reader is arranged at an intersection of a roadway corresponding to the optimal transportation route, and the optimal transportation route is divided into a plurality of locked intervals, and the length of each locked interval is the length between two RFID card readers adjacent to each other.

The path planning algorithm includes the following.

Firstly, all feasible transportation routes Line' are determined by utilizing the distributions of the departure and the destination in combination with a roadway map.

Subsequently, the distance $X_i$ between each two card readers is determined in advance by utilizing a distribution and coding information of each RFID card reader in the roadway.

Then, the total mileage $S_i$ of each transportation rout is calculated.

Eventually, a minimum total mileage $S_{min}$ is obtained by comparing the total mileage of each transportation route, and a transportation route corresponding to the minimum total mileage $S_{min}$ is the optimal transportation route.

The coding information of the RFID card reader includes a serial number and position information of the RFID card reader as well as distance information between the RFID card reader and an adjacent RFID card reader.

In S20, an RFID tag is respectively set at front and rear ends of the coal mine auxiliary transportation vehicle respectively, the distance between the two RFID tags is a length L of the coal mine auxiliary transportation vehicle, and an initial velocity $v_0$ of the coal mine auxiliary transportation vehicle passing through each locked interval is determined by utilizing the length L of the coal mine auxiliary transportation vehicle and the time T took by each RFID card reader to read the two tags at the front and rear ends of the coal mine auxiliary transportation vehicle.

The initial velocity $v_0$ is the velocity when the coal mine auxiliary transportation vehicle just enters a starting point of one of the locked intervals. The value of the initial velocity $v_0$ is equal to a ratio of the length L of the coal mine auxiliary transportation vehicle to the time T took by the RFID card reader to read the two RFID tags at the front and rear ends of the coal mine auxiliary transportation vehicle, that is, $v_0 = L/T$.

In S30, a discretization mileage estimation model is constructed by utilizing the initial velocity $v_0$ of the coal mine auxiliary transportation vehicle passing through each locked interval to update a real-time position of the coal mine auxiliary transportation vehicle, and dynamic trajectory information of the coal mine auxiliary transportation vehicle in each locked interval is obtained.

The discretization mileage estimation model is $x = v_0 t + w(t)$, where $w(t)$ denotes a model noise. The mileage will also increase accordingly over time, so that the rough dynamic trajectory information of the coal mine auxiliary transportation vehicle in the locked interval can be obtained.

Further, $w(t)$ is determined by the following formula, $w(t) = kt$, where k denotes a complexity. The determination of $w(t)$ requires to analyze the road surface conditions of the coal mine auxiliary transportation vehicle in the process of the travelling, and comprehensively consider the factors such as the travelling velocity, road slope and road surface quality of the coal mine auxiliary transportation vehicle, and then characterize the travelling conditions of the vehicle through the complexity. The complexity calibrated in this embodiment is as follows.

When the coal mine auxiliary transportation vehicle is in an upslope state, $k = -0.5 v_0$.

When the coal mine auxiliary transportation vehicle is in a downslope state, $k = 0.5 v_0$.

When the coal mine auxiliary transportation vehicle is in a state of travelling on a flat road, $k = 0$.

When the coal mine auxiliary transportation vehicle is in a state of parking and waiting or loading and unloading, $k = -v_0$.

In S40, a [v0, t] prediction model is constructed by utilizing the initial velocity $v_0$ of the coal mine auxiliary transportation vehicle passing through each locked interval and historical statistical information of a time t took by the coal mine auxiliary transportation vehicle passing through each locked interval, and a theoretical time $t_0$ of the coal mine auxiliary transportation vehicle passing through each locked interval is obtained through the prediction model.

The $[v_0, t]$ prediction model is a mapping relationship between $v_0$ and t, that is, $[v_{01}, v_{02} \ldots, t_1, t_2, \ldots]$, the input value is the initial velocity $v_0$ of the vehicle entering the locked interval, and the output is the theoretical time $t_0$ of the vehicle passing through the locked interval, by utilizing the historical statistical information of $v_0$ and t according to the prediction model.

The prediction model can be constructed by methods such as machine learning, deep learning. The method of unitary linear regression is adopted to construct the prediction model in this embodiment.

The main task of unitary regression is to estimate another variable from one of the two related variables. The variable to be estimated is called as the dependent variable, which is set as Y, and the variable obtained by the estimation is called as the independent variable, which is set as X.

Figure 2:
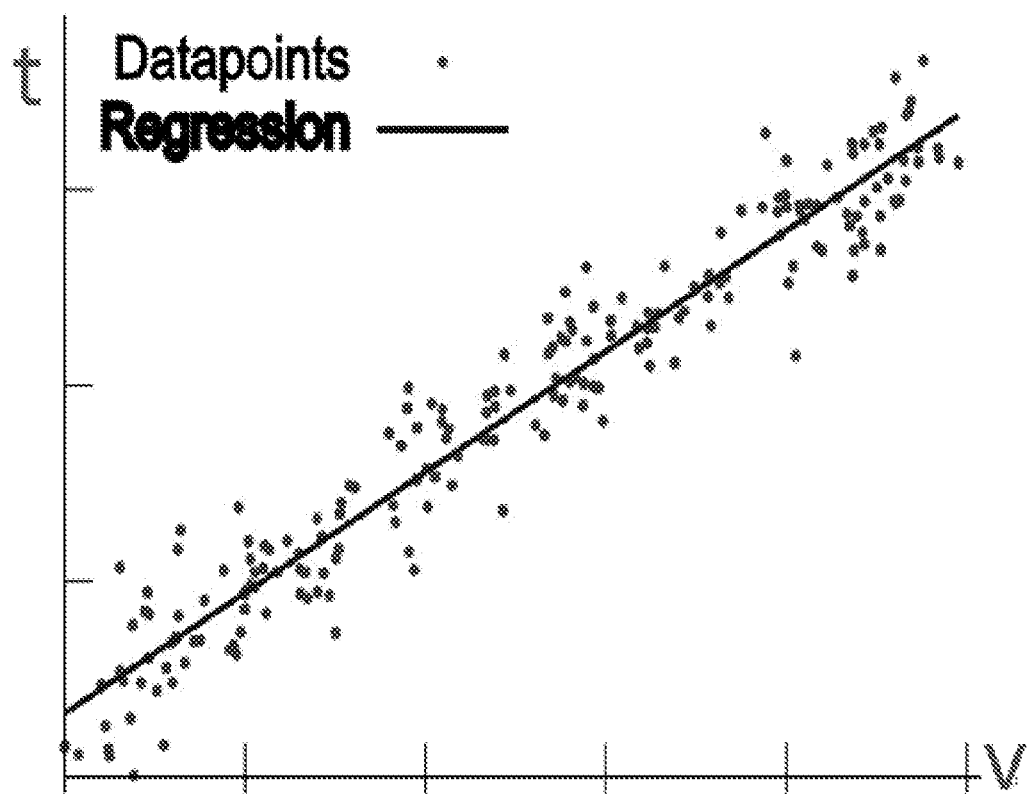
FIG. 2 illustrates a schematic diagram of an univariate linear regression method in Embodiment 1.

Regression analysis is to find a mathematical model $Y = f(X)$, so that the estimation of Y from X can be calculated by a function. When the form of $Y = f(X)$ is a straight line equation, that is called as the unitary linear regression. As illustrated in FIG. 2, in this embodiment, the equation is expressed as $t = A v_0 + B$. According to the least squares method, the value of the regression coefficient A and the constant term B can be determined from the sample data. After A and B are determined, one estimation value of to can be obtained by one observation value $v_0$.

In S50, an actual time t and the theoretical time $t_0$ of the coal mine auxiliary transportation vehicle passing through each locked interval are compared.

When $t \leq t_0$, an overtime early-warning and an overtime alarm are not started, and a positioning of Step S30 is executed at this time.

When $t_0 \leq t \leq 1.1 t_0$, the overtime early-warning is started, and a driver is reminded that an overtime has occurs and an operation status is inquired.

When $t > t_0$, the overtime alarm is started, a remote server acquires position information of the coal mine auxiliary vehicle actively and corrects the dynamic trajectory information in Step S30 by utilizing the position information, and a precise dynamic position and trajectory information of the coal mine auxiliary transportation vehicle are obtained.

The overtime early-warning and the overtime warning are performed through the explosion-proof mobile phone terminal arranged in the cab of the coal mine auxiliary transportation vehicle.

When the overtime early-warning is performed, the remote server reminds the driver that traveling in the interval has exceeded the time limit through the explosion-proof mobile phone terminal, and inquires the driver about the operation status.

When the overtime warning is performed, the remote server acquires position information of the explosion-proof mobile phone actively, the explosion-proof mobile phone terminal and the existing underground wireless base station are dynamically networked, and the explosion-proof mobile phone may be precisely positioned by utilizing the wireless positioning technology, so as to determine the precise position information of the coal mine auxiliary transportation vehicle. The remote server feeds back the obtained real-time precise position of the coal mine auxiliary transportation vehicle to the dynamic trajectory information in the locked interval obtained by S30, and corrects and updates its position, which is subject to the positioning information of the explosion-proof mobile phone terminal, until the coal mine auxiliary transportation vehicle enters the next locked interval.

Further, in this embodiment, the triggering threshold of the overtime alarm is set to exceed the theoretical time $t_0$ by 0.1 times, which can improve the compatibility and flexibility of this method.

Further, in this embodiment, the triggering conditions of the overtime alarm are not only limited to triggering after exceeding the theoretical time, but also start the overtime alarm in case of vehicle failure, abnormal loading and unloading, or driver abnormality.

In S60, the overtime alarm is ended after the coal mine auxiliary vehicle travels to an endpoint position of the locked interval and a card is read successfully, then when the coal mine auxiliary vehicle enters the next locked interval, Step S30, Step S40 and Step S50 are repeated.

When the coal mine auxiliary transportation vehicle passes through the endpoint position of the locked interval where the vehicle is located, the RFID card reading device arranged in the endpoint position recognizes the tag arranged on the coal mine auxiliary transportation vehicle, and feeds back the coding information of the RFID card reader to the remote sever. The position information is taken as the initial point of the positioning of the coal mine auxiliary transportation vehicle in the next locked interval, and it is repeated in such a cycle until the coal mine auxiliary transportation vehicle travels to the destination and the positioning is completed.

The low-energy-consumption grading and positioning method for the coal mine auxiliary transportation vehicle in this embodiment realizes the on-demand and low-energy-consumption positioning for the coal mine auxiliary transportation vehicle through determining the optimal transportation route and setting the RFID card reader arranged at the intersection of each roadway to divide the entire transportation route into each locked interval for positioning, and combining the mileage estimation model, theoretical time prediction model, overtime warning/alarm strategy, wireless positioning technology.

Embodiment 2

Figure 3:
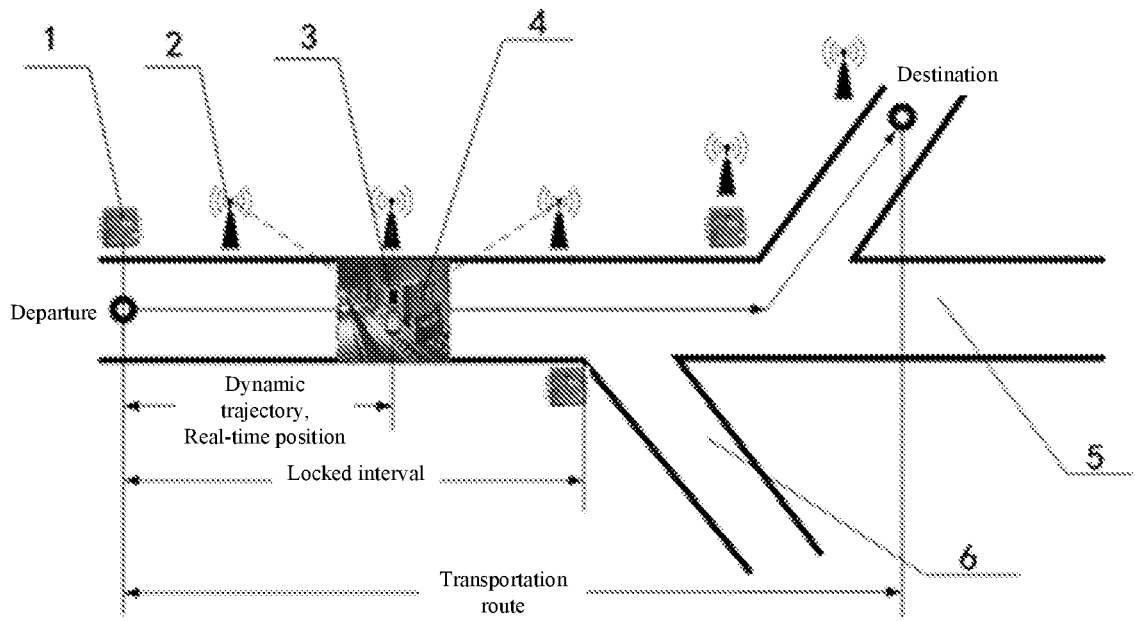
FIG. 3 illustrates a schematic diagram of a system in the present disclosure.

As illustrated in FIG. 3, the low-energy-consumption grading and positioning system for the coal mine auxiliary transportation vehicle in this embodiment that based on the low-energy-consumption grading and positioning method for the coal mine auxiliary transportation vehicle in Embodiment 1 includes as follows.

An RFID card reading device 1 is arranged at an entrance of the main roadway 5 and an intersection of each roadway branch 6.

The two RFID tags are respectively arranged at the front and rear ends of the coal mine auxiliary transportation vehicle 4.

The explosion-proof mobile phone terminal 3 is arranged in the cab of the coal mine auxiliary transportation vehicle 4.

The wireless base station 2 is arranged on one side of the main roadway 5 and the roadway branch 6 for transmitting the wireless signal, the wireless base station and the explosion-proof mobile phone terminal 3 may be dynamically networked.

Embodiment 3

In this embodiment, the structures of the underground roadway and the coal mine auxiliary transportation vehicle are improved based on the solution of Embodiment 2, the RFID card reading device, the RFID tags, the explosion-proof mobile phone terminal and the wireless base station are configured at the appropriate location, and the prepared positioning system is adopted to perform the positioning method in Embodiment 1 when the coal mine auxiliary transportation vehicle transports the materials.

Figure 4:
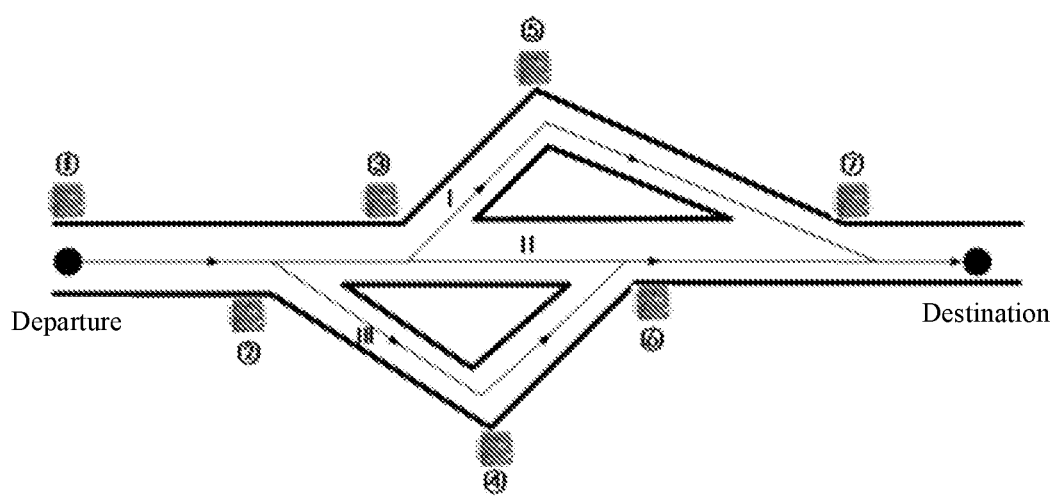
FIG. 4 illustrates a schematic diagram of determining a transportation route in Embodiment 3.

When Step S10 is performed, the optimal transportation route of the coal mine auxiliary transportation vehicle is determined by utilizing the path planning algorithm. As illustrated in FIG. 4, after the optimal transportation route is determined, the entire route is converted into each locked interval to perform the interval positioning. Taking the route I in FIG. 4 as an example, the respective locked intervals are: ①-②, ②-③, ③-⑤, ⑤-⑦.

Figure 5:
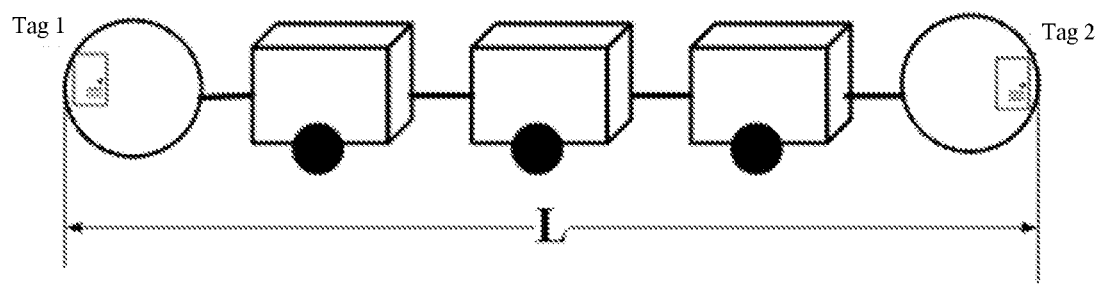
FIG. 5 illustrates a schematic diagram of acquiring an initial velocity in a locked interval in Embodiment 3.

When Step S20 is performed, an RFID tag is arrange at the front and rear ends of the coal mine auxiliary transportation vehicle respectively, and the distance between the two RFID tags is the length L of the coal mine auxiliary transportation vehicle, as illustrated in FIG. 5, according to the formula $v_0=L/T$, the initial velocity $v_0$ of the coal mine auxiliary transportation vehicle passing through each locked interval is determined.

Figure 6:
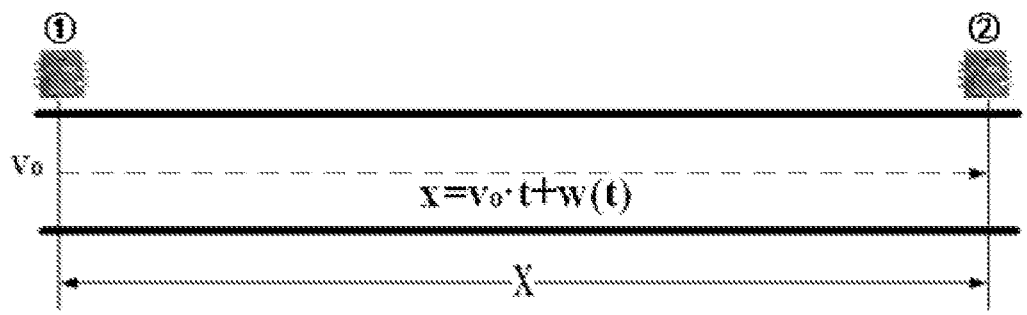
FIG. 6 illustrates a schematic diagram of a dynamic trajectory generated by a mileage estimation model in Embodiment 3.

When Step S30 is performed, the schematic diagram of the dynamic trajectory generated by the mileage estimation model is as illustrated in FIG. 6. The initial velocity v0 of the coal mine auxiliary transportation vehicle entering each locked interval is utilized, and the actual road conditions and other factors are comprehensively considered. The discretized mileage model is $x=v_0 t+w(t)$, where $w(t)$ denotes the noise of the model. The mileage will also increase accordingly over time, and then the dynamic trajectory information of the coal mine auxiliary transportation vehicle in the locked interval is obtained.

The embodiments described in the present disclosure are only to describe the preferred embodiments of the present disclosure, and do not limit the concept and scope of the present disclosure. Without departing from the design idea of the present disclosure, all kinds of deformations and improvements made by those of ordinary skilled in the art to the technical solutions of the present disclosure should fall within the protection scope of the present disclosure.

What is claimed is:

1. A low-energy-consumption grading and positioning method for a coal mine auxiliary transportation vehicle, comprising following steps:
   S10, determining, according to distribution information of a departure and a destination in the coal mine auxiliary transportation vehicle, an optimal transportation route of the coal mine auxiliary transportation vehicle by utilizing a path planning algorithm, wherein an RFID card reader is arranged at an intersection of a roadway corresponding to the optimal transportation route, and dividing the optimal transportation route into a plurality of locked intervals, wherein a length of each locked interval is a distance between two RFID card readers adjacent to each other;
   S20, setting an RFID tag at front and rear ends of the coal mine auxiliary transportation vehicle, respectively, wherein a distance between the two RFID tags is a length L of the coal mine auxiliary transportation vehicle, and determining, by utilizing the length L of the coal mine auxiliary transportation vehicle and a time T took by each RFID card reader to read the two tags at the front and rear ends of the coal mine auxiliary transportation vehicle, an initial velocity $v_0$ of the coal mine auxiliary transportation vehicle passing through each locked interval;
   S30, constructing, by utilizing the initial velocity $v_0$ of the coal mine auxiliary transportation vehicle passing through each locked interval, a discretization mileage estimation model, to update a real-time position of the coal mine auxiliary transportation vehicle, and obtaining dynamic trajectory information of the coal mine auxiliary transportation vehicle in each locked interval;

S40, constructing, by utilizing the initial velocity $v_0$ of the coal mine auxiliary transportation vehicle passing through each locked interval and historical statistical information of a time t took by the coal mine auxiliary transportation vehicle passing through each locked interval, a $[v_0, t]$ prediction model, and obtaining, through the prediction model, a theoretical time $t_0$ of the coal mine auxiliary transportation vehicle passing through each locked interval;

S50, comparing an actual time t and the theoretical time $t_0$ of the coal mine auxiliary transportation vehicle passing through each locked interval, not starting, when $t \le t_0$, an overtime early-warning and an overtime alarm, and executing a positioning of Step S30 at this time, starting, when $t_0 \le t \le 1.1 t_0$, the overtime early-warning, and reminding a driver that an overtime occurs and inquiring an operation status, and staring, when $t > t_0$, the overtime alarm, acquiring, by a remote server, position information of the coal mine auxiliary vehicle actively, and correcting, by using the position information, the dynamic trajectory information in Step S30, and obtaining a precise dynamic position and trajectory information of the coal mine auxiliary transportation vehicle; and S60, ending, after the coal mine auxiliary vehicle travels to an endpoint position of the locked interval and a card is read successfully, the overtime alarm, then repeating, when the coal mine auxiliary vehicle enters the next locked interval, Step S30, Step S40 and Step S50.

2. The low-energy-consumption grading and positioning method for the coal mine auxiliary transportation vehicle according to claim 1, wherein in Step S10, the path planning algorithm includes:

firstly, determining, by utilizing the distributions of the departure and the destination, all feasible transportation routes $Line_i$ in combination with a roadway map;

subsequently, determining, by utilizing a distribution and coding information of each RFID card reader in the roadway, a distance $X_i$ between each two card readers in advance;

then, calculating a total mileage $S_i$ of each transportation route; and eventually, obtaining, by comparing the total mileage of each transportation route, a minimum total mileage $S_{min}$, wherein a transportation route corresponding to the minimum total mileage $S_{min}$ is the optimal transportation route.

3. The low-energy-consumption grading and positioning method for the coal mine auxiliary transportation vehicle according to claim 2, wherein the coding information of the RFID card reader includes a serial number and position information of the RFID card reader as well as distance information between the RFID card reader and an adjacent RFID card reader.

4. The low-energy-consumption grading and positioning method for the coal mine auxiliary transportation vehicle according to claim 1, wherein the initial velocity $v_0$ in Step S20 is determined by a following formula, $v_0 = L/T$.

5. The low-energy-consumption grading and positioning method for the coal mine auxiliary transportation vehicle according to claim 1, wherein in Step S30, the discretization mileage estimation model is $x = v_0 t + w(t)$, wherein $w(t)$ denotes a model noise.

6. The low-energy-consumption grading and positioning method for the coal mine auxiliary transportation vehicle according to claim 5, wherein the $w(t)$ is determined by a following formula, $w(t) = kt$, wherein k denotes a complexity.

7. The low-energy-consumption grading and positioning method for the coal mine auxiliary transportation vehicle according to claim 6, wherein when the coal mine auxiliary transportation vehicle is in an upslope state, $k = -0.5 v_0$;

when the coal mine auxiliary transportation vehicle is in a downslope state, $k = 0.5 v_0$;

when the coal mine auxiliary transportation vehicle is in a state of travelling on a flat road, $k = 0$; and when the coal mine auxiliary transportation vehicle is in a state of parking and waiting or loading and unloading, $k = -v_0$.

8. The low-energy-consumption grading and positioning method for the coal mine auxiliary transportation vehicle according to claim 1, wherein in Step S40, the $[v_0, t]$ prediction model is constructed by utilizing the $v_0$ and the historical statistical information of t through a machine learning or deep learning.

9. The low-energy-consumption grading and positioning method for the coal mine auxiliary transportation vehicle according to claim 1, wherein in Step S50, the overtime early-warning and the overtime alarm are performed through an explosion-proof mobile phone terminal arranged in a cab of the coal mine auxiliary transportation vehicle;

when the overtime early-warning is performed, the remote server reminds and inquires the driver through the explosion-proof mobile phone terminal; and when the overtime alarm is performed, the remote server acquires position information of the explosion-proof mobile phone terminal actively, thereby determining precise position information of the coal mine auxiliary transportation vehicle.

10. A low-energy-consumption grading and positioning system for a coal mine auxiliary transportation vehicle, wherein the system is based on the low-energy-consumption grading and positioning system according to claim 1, comprising:

an RFID card reading device (1) arranged at an entrance of a main roadway (5) and an intersection of each roadway branch (6);

two RFID tags, respectively arranged at front and rear ends of the coal mine auxiliary transportation vehicle (4);

an explosion-proof mobile phone terminal (3), arranged in a cab of the coal mine auxiliary transportation vehicle (4); and a wireless base station (2), arranged on one side of the main roadway (5) and the roadway branch (6), and configured to transmit a wireless signal.

* * * * *